United States Patent
Pinzl

(10) Patent No.: US 9,340,848 B2
(45) Date of Patent: May 17, 2016

(54) SCREW MADE OF LOW-ALLOY CARBON STEEL, AND METHOD FOR PRODUCING SUCH A SCREW

(75) Inventor: Wilfried Pinzl, Tambach-Dietharz (DE)

(73) Assignee: EJOT GMBH and Co. KG, Bad Berleburg (DE)

( * ) Notice: Subject to any disclaimer, the term of this patent is extended or adjusted under 35 U.S.C. 154(b) by 208 days.

(21) Appl. No.: 13/995,862

(22) PCT Filed: Nov. 28, 2011

(86) PCT No.: PCT/EP2011/071153
§ 371 (c)(1),
(2), (4) Date: Jul. 25, 2013

(87) PCT Pub. No.: WO2012/084413
PCT Pub. Date: Jun. 28, 2012

(65) Prior Publication Data
US 2013/0302109 A1   Nov. 14, 2013

(30) Foreign Application Priority Data
Dec. 20, 2010   (DE) .......................... 10 2010 055 210

(51) Int. Cl.
*C21D 9/00* (2006.01)
*C23C 8/04* (2006.01)
*C23C 8/80* (2006.01)
*C23C 8/02* (2006.01)
*F16B 35/00* (2006.01)

(52) U.S. Cl.
CPC .............. *C21D 9/0093* (2013.01); *C23C 8/02* (2013.01); *C23C 8/04* (2013.01); *C23C 8/80* (2013.01); *F16B 35/00* (2013.01); *C21D 2221/00* (2013.01)

(58) Field of Classification Search
CPC .......... B21H 3/02; C21D 9/0093; C23C 8/02; C23C 8/04; C23C 8/80
See application file for complete search history.

(56) References Cited

U.S. PATENT DOCUMENTS

| 3,894,570 A | 7/1975 | Reynolds |
| 4,664,722 A | 5/1987 | Clinkscales et al. |
| 2004/0154705 A1* | 8/2004 | Friederich et al. ............. 148/567 |
| 2004/0235576 A1 | 11/2004 | Friederich et al. |
| 2007/0062620 A1 | 3/2007 | Friederich et al. |

FOREIGN PATENT DOCUMENTS

| CN | 1536236 A | 10/2004 |
| DE | 2415619 | 11/1974 |
| DE | 2831439 A1 | 4/1979 |
| DE | 19815670 A1 | 11/1998 |
| DE | 10113946 A1 | 9/2002 |
| DE | 102007014407 A1 | 10/2008 |
| DE | 202009011665 U1 | 1/2010 |
| EP | 1466990 A1 | 10/2004 |
| GB | 2006833 A | 5/1979 |
| WO | WO 03/046229 A1 | 6/2003 |

* cited by examiner

*Primary Examiner* — Teresa M Ekiert
(74) *Attorney, Agent, or Firm* — Birch, Stewart, Kolasch & Birch, LLP

(57) ABSTRACT

The invention relates to a screw having a head, an adjoining retaining section and a functional tip for use as a self-tapping screw. The functional tip is of greater hardness than the retaining section. The entire screw is made of hardened low-alloy carbon steel. The special feature of this screw is that its functional tip has a higher carbon and/or nitrogen content than its retaining section.

4 Claims, 1 Drawing Sheet

SCREW MADE OF LOW-ALLOY CARBON STEEL, AND METHOD FOR PRODUCING SUCH A SCREW

Figure 1:
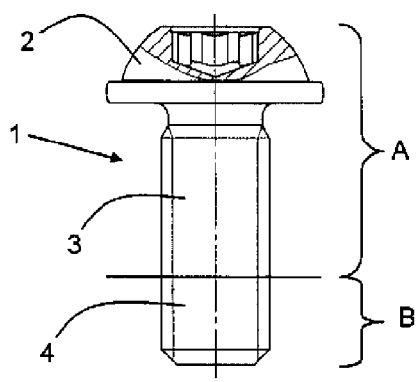

The invention relates to a screw having a head, an adjoining retaining section and a functional tip which is of greater hardness than the retaining section and is made of hardened low-alloy carbon steel.

Known from EP 1 466 990 A1 is a screw consisting of low-alloy carbon steel having a partially hardened functional tip, and a process for making same. According to this prior art method, the hardening step is performed by rapid heating with a high energy transfer and subsequent quenching, and limited to partial regions of the periphery of the functional tip. This hardening step can be performed both on tempered screws and on completely case-hardened screws.

Experience has shown that when a screw produced in this way is screwed into a female part made of high-strength material, the screw cannot be reliably screwed into this part either due to insufficient hardness (in the case of tempered screws) or excessive brittleness (in the case of case-hardened screws). Consequently, such screws need to be improved as regards their strength properties. This can be accomplished by designing the screw such that its functional tip has a higher carbon and/or nitrogen content than its retaining section.

The method for producing this screw consists of first providing an insulating layer, which functions as a diffusion barrier, on and over the head and the retaining section of the screw, and then exposing the screw to a carbon- and/or nitrogen-enriched atmosphere after heating it to a temperature above the austenitizing temperature. Thereby, the screw undergoes an enrichment process that is restricted to its functional tip. Subsequently, the screw is quenched and annealed and thus undergoes a hardening step whose effect will be higher in the area of the functional tip than in the area of its head and retaining section, due to the insulating layer.

Owing to the application of an insulating layer in the area of the head and the retaining section of the screw, special measures can be used to subject the as yet uncoated area of the screw to a treatment which will result in a particular hardening of this area. To be more precise, this area is the part of the screw which will be exposed to particularly high stress as the screw is being screwed into a female part -which, in the case of prior art screws, often results in a breaking of the screw and thus makes it impossible to obtain the desired screwed connection. The area covered by the insulating layer is only subjected to conventional tempering.

The hardness of the functional tip may be increased further after annealing by a short heating step, followed by a quenching procedure. This short heating step may be performed in various ways, i.e. by means of induction or through the use of an electron beam or a laser beam, for example.

The screw in question will thus have a functional tip that can be specially hardened due to its increased carbon and/or nitrogen content and will therefore be capable of withstanding high stresses without any problem.

Figure 2:
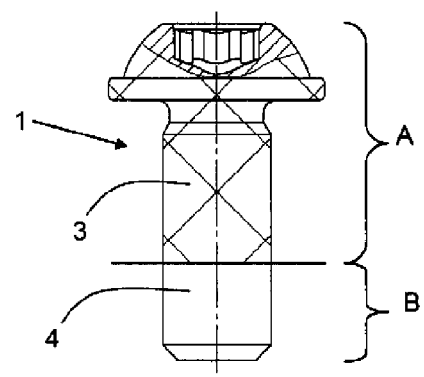
Figure 3:
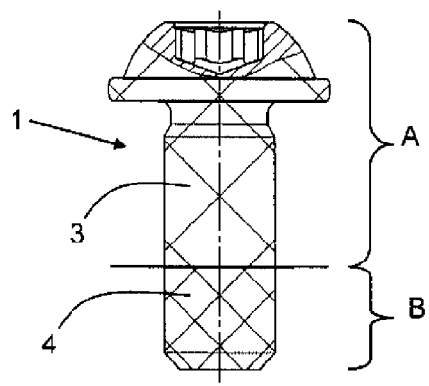
Figure 4:
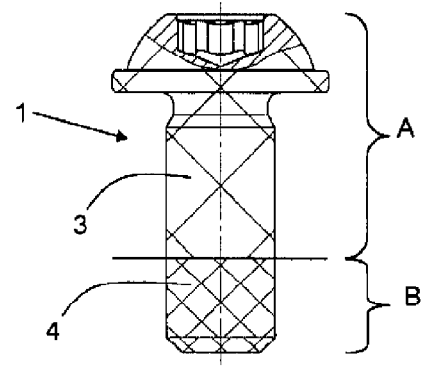
Figure 5:
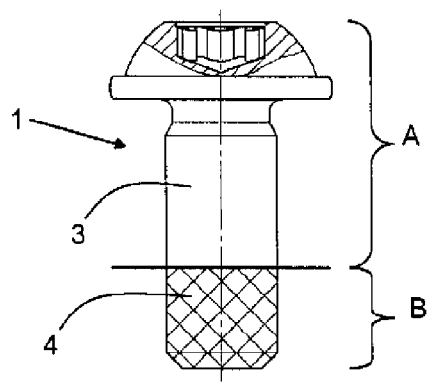

Shown in the drawings is an embodiment of the invention. Of the drawings,

FIG. 1 is a view of the exterior design of the unhardened screw;

FIG. 2 a view of the same screw which has been provided with an insulating layer (diffusion barrier) which extends from the screw head to the beginning of the area with the functional tip;

FIG. 3 is a view of the same screw of which only the functional tip has been enriched with carbon and/or nitrogen;

FIG. 4 a view of the same screw, hardened this time;

FIG. 5 a view of the same screw as shown in FIG. 4 whose functional tip has been additionally hardened.

The embodiment illustrated in FIG. 1 is an unhardened screw 1 having the screw head 2 and the retaining section 3 (area A) but no particular thread as the thread can be of any type, for example a single-start thread or a multiple-start thread and is irrelevant in this connection. Adjoining the retaining section 3 is the functional tip 4 (area B) into which the thread transitions continuously from the retaining section 3.

In the course of the method for producing the screw which is especially hardened in the area of its functional tip 4, the screw 1 is provided with a diffusion barrier (insulating layer). This design in shown in FIG. 2 in that area A is additionally cross-hatched to indicate the diffusion barrier.

Subsequently, the screw is exposed to a temperature above the austenitizing temperature which process occurs in a carbon- and/or nitrogen-enriched atmosphere so that only the functional tip (area B) will be superficially enriched with carbon and/or nitrogen with a certain penetration depth. Owing to the previously deposited insulating layer, such enrichment will be restricted to the functional tip 4 and/or the cross-hatched area B of FIG. 3.

FIG. 4 shows the same screw but after having undergone a hardening step which has made it harder in its functional tip and/or the area B (narrow cross-hatching) due to the previous carbon- and/or nitrogen-enrichment compared to area A which was not carbon- or nitrogen-enriched.

FIG. 5 shows the screw 1 which was additionally hardened in the area of its functional tip in which the diffusion barrier has been removed with a view to the later use of the screw and which has undergone a hardening process (for example by induction or through the use of an electron beam or a laser beam) which only extended to the functional tip 4 (area B) as regards hardening the material. The remaining area A will thus not undergo this treatment. The screw shown in FIG. 5 has a particularly hard functional tip (4) (see the narrow cross-hatching in area B). Thus a screw has been created as desired of which merely the hardness of the area of its functional tip has been particularly increased with a view to its further use as a self-tapping screw.

The invention claimed is:

1. A method for producing a screw having a head, an adjoining retaining section and a functional tip, said functional tip having a greater hardness than the retaining section and is made of a hardened, low-alloy carbon steel, which comprises:
   providing an insulating layer, which functions as a diffusion barrier and extends over the entire head and retaining section of the screw,
   heating the screw to a temperature above the austenitzing temperature,
   exposing the screw to a carbon and/or nitrogen-enriched atmosphere, whereby the screw undergoes a carbon or nitrogen enrichment step that is restricted to its functional tip,
   hardening the screw by quenching and annealing the screw, and
   exposing the functional tip to a heat treatment following the annealing step in order to increase its hardness whereby the functional tip, due to the presence of the insulating layer, has a higher carbon and/or nitrogen content than that of the retaining section of the screw.

2. The method of claim 1, wherein the heat treatment is performed by means of induction.

3. The method of claim 1, wherein the heat treatment is performed by means of an electron beam.

4. The method of claim 1, wherein the heat treatment is performed by means of a laser beam.

* * * * *